Nov. 4, 1941.    L. THOMPSON    2,261,815
POSITION INDICATOR FOR INSTRUMENT POINTERS
Filed Aug. 16, 1937

INVENTOR
*Lincoln Thompson*
BY
*H. G. Manning*
ATTORNEY

Patented Nov. 4, 1941

2,261,815

UNITED STATES PATENT OFFICE 2,261,815

POSITION INDICATOR FOR INSTRUMENT POINTERS

Lincoln Thompson, Stamford, Conn., assignor to The Bristol Company, Waterbury, Conn., a corporation of Connecticut Application August 16, 1937, Serial No. 159,444

4 Claims. (Cl. 250—27)

This invention relates to instruments, and more particularly to electrical means for indicating when the delicate pointer of an instrument has reached a predetermined point in its swing.

One object of the present invention is to provide a device of the above nature in which the pointer is provided with a small metal disc in which eddy currents are adapted to be induced by its passage into the field of a small inductance coil, thereby automatically varying the elements of an oscillating electrical circuit to which the coil is connected so as to cause changes of current which can be applied to suitable relays or other electrical recording, controlling or indicating apparatus.

A further object is to provide a device of the above nature in which the passage of the delicate pointer beyond a predetermined point will be automatically indicated with the aid of an audion tube without the making of any mechanical contacts with said pointer which might produce undesirable frictional retarding effects upon said pointer, and without introducing any other appreciable retarding effects thereon.

A further object is to provide a device of the above nature which will be simple in construction, inexpensive to manufacture, easy to install and manipulate, compact, ornamental in appearance, and very efficient and durable in use.

With these and other objects in view, there have been illustrated on the accompanying drawing three forms in which the invention may be conveniently embodied in practice.

Figure 1:
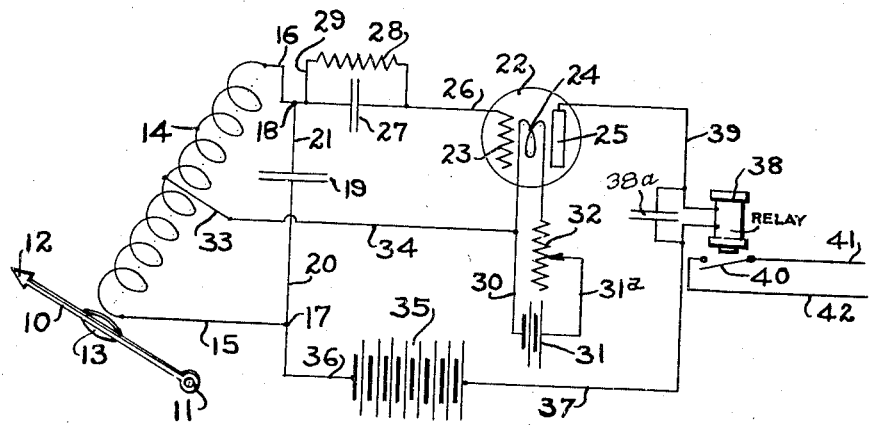
Fig. 1 represents a circuit diagram of the first form in which the invention may be embodied.

Referring now to the drawing in which like reference characters denote corresponding parts throughout the several views, the first form of the invention shown in Fig. 1 will now be described. In this figure, the numeral 10 indicates a delicate pointer of a meter, temperature indicator, or other instrument, said pointer having a pivot eye 11 at one end, and being provided with an indicating arrow 12 at the other end.

Intermediate the ends of the pointer 10, provision is made of a flat metal disc 13, herein shown as elongated in shape, attached to said pointer in any desired manner. The path of the disc 13 passes through the electromagnetic field of an inductance coil 14, the ends of which coil are connected by conductors 15 and 16 to junction points 17 and 18, respectively. Provision is also made of a tuning condenser 19 which is connected by conductors 20 and 21 to the junctions 17 and 18, respectively.

The coil 14 carries radio frequency oscillations produced by a three-element audion tube amplifier 22 containing a grid 23, a heated filament 24 and a plate 25. The grid 23 is connected by a conductor 26 to a condenser 27 which is bridged by a grid leak resistance 28, the latter being connected to the junction 18 by a conductor 29. The filament 24 is connected by a conductor 30 to a low voltage battery 31, which in turn is connected by a conductor 31a to a variable resistance 32 leading to the opposite end of the filament 24. The coil 14 has a tap 33 at its mid point which is connected by a conductor 34 to the conductor 30.

A high voltage battery 35 is connected by a conductor 36 to the junction 17, and by a conductor 37 to one terminal of a relay 38, the other terminal of which leads through a conductor 39 to the plate 25 of the tube 22. The relay 38 is provided with a by-pass condenser 38a and has a movable iron armature 40 adapted to be attracted by the magnetized core of the relay to close a circuit including the wires 41 and 42 for controlling any desired auxiliary mechanism.

In the operation of the first form of the invention the inductance coil 14 and the condenser 19 will be chosen of such values as to cause the audion tube 22 to oscillate at radio frequency.

It will be understood that when the metal disc 13 carried by the delicate instrument pointer swings to the predetermined indicating position in the electromagnetic field of the inductance coil 14, eddy currents will be induced in said disc, and corresponding energy losses will take place in said coil. These losses will affect the oscillation of the vacuum tube circuits, and the constants of said circuits should be so selected that the oscillation of the tube may be caused to cease entirely—thus changing the plate current to that corresponding to zero grid bias.

When the tube 22 is oscillating, its bias will, of course, be determined by the values of the grid leak resistance, the grid condenser and the intensity of the oscillations, the amount of this bias being evidenced by a change in the mean plate current to which the relay 38 will be responsive.

It will also be understood that even though the dimensions of the coil 14 and the metal discs 13 are quite small, a relatively large change of current will occur in the oscillator tube plate circuit when the pointer disc passes into the field of the coil 14.

It will be further understood that the present invention is not confined to the use of the metal disc 13 attached to the pointer, but if desired, said disc may be omitted and the metal pointer itself utilized to produce the desired changes of current in the plate circuit for operating the relay.

It will also be understood that by adjusting the position of the inductance coil 14, the point at which the instrument pointer will actuate the relay may be changed accordingly.

It is desirable to keep the force due to the reaction between the coil and the metal piece so small that said force will be negligible compared to the mechanical forces actuating the pointer. This is accomplished by employing a small oscillator tube of low power and by keeping the regenerative coupling between the plate and grid circuits at the minimum.

Moreover, the losses in the oscillating circuit must be very small so as to make said circuit as sensitive as possible. Hence, the coil must have low radio frequency resistance, its inductance must be in relation to the condenser capacity to provide an unstable oscillating condition, the condenser must have low radio frequency losses, and losses introduced by elements external to the coil and condenser should be at a minimum.

*Second form*

Figure 2:
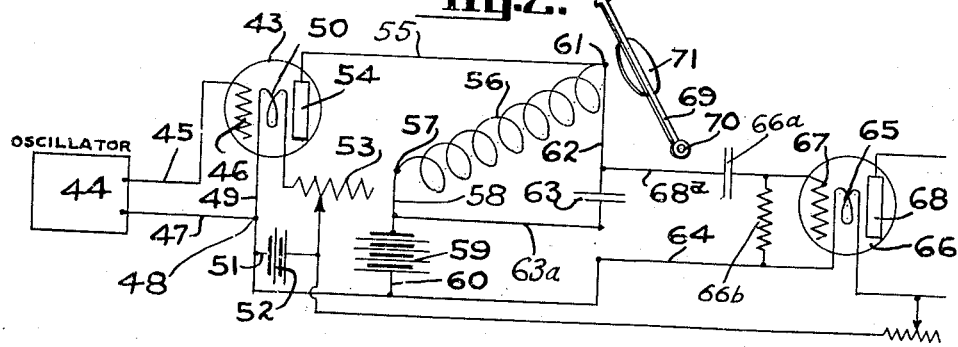
Fig. 2 is a similar circuit diagram of the second form of the invention.

In the modified form of the invention disclosed in Fig. 2, oscillations will be imparted to the grid circuit of a three-electrode audion tube 43 by means of a radio frequency oscillator 44 of any suitable type. The oscillator 44 is connected by a conductor 45 to the grid 46 of the tube 43, and by a conductor 47 to a junction 48 from which leads a conductor 49 connected to one end of a filament 50. The conductor 49 is connected by a conductor 51 to one terminal of a low voltage battery 52, the other terminal of which is connected by a variable resistance 53 to the other end of the filament 50.

The amplifier tube 43 is provided with a plate 54 which is connected by a conductor 55 to one end of an inductance coil 56, the other end 57 of which is connected by a conductor 58 to one terminal of a battery 59 of relatively high voltage. The other terminal of the battery 59 is connected by a conductor 60 to the conductor 49 leading to the filament 50.

The inductance coil 56 is also connected at a junction 61 to a conductor 62 leading to one side of a tuning condenser 63, the opposite side of which is connected by a conductor 63a to the conductor 58. The conductor 63a is connected through the battery 59 and a conductor 64 to a filament 65 of an amplifier rectifier audion tube 66 containing a grid 67 and a plate 68, said grid 67 being connected through a condenser 66a to a conductor 68a leading to the conductor 62. A delicate instrument pointer 69 is pivoted at a point 70 in proximity to the coil 56 in such a manner that a small metal disc 71 carried thereby will swing into and out of the electromagnetic field of the coil 56, as shown.

In this form of the invention, the plate circuit of the amplifier tube 43 is coupled to the grid circuit of the second amplifier rectifier tube 66. By means of this arrangement it will be understood that the tube 66 will amplify at full strength only when the coil 56 and the condenser 63 are tuned to the frequency generated by the oscillator 44—the impedance of the plate circuit of the tube 43 being very high at this radio frequency.

In the operation of this form of the invention, when eddy current losses are introduced into the plate circuit of the amplifier tube 43 due to the passage of the small metal plate 71 into the field of the coil 56, the impedance of the plate circuit will suddenly drop, causing a corresponding sharp reduction in the voltage applied to the grid of the amplifier rectifier tube 66. The amplifier rectifier tube 66 is also provided with a grid leak resistance 66b which, together with the condenser 66a, causes the signals applied to the grid of said tube to be rectified. The rectified signals will cause changes in the plate current of the tube 66 which will actuate a suitable responsive relay and control equipment, not shown.

*Third form*

Figure 3:
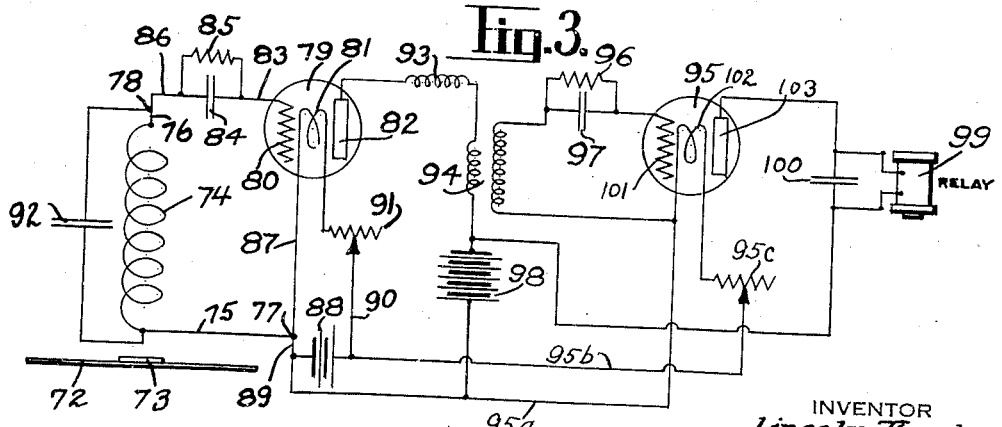
Fig. 3 is a circuit diagram of a third form of the invention.

In the third form of the invention shown in Fig. 3, the numeral 72 indicates a delicate instrument pointer, and the numeral 73, a metal disc carried thereby.

The disc 73 is adapted to swing into the electromagnetic field of an induction coil 74, the ends of which are connected by conductors 75 and 76 to junction points 77 and 78, respectively. The coil 74 carries radio frequency oscillations produced by a three-element audion tube 79 containing a grid 80, a filament 81, and a plate 82. The grid 80 is connected by a conductor 83 to a condenser 84 which is bridged by a grid leak resistance 85, the latter being connected to the junction 78 by a conductor 86.

The filament 81 is connected by a conductor 87 to the junction 77 and is energized by a low voltage battery 88 connected to the junction 77 by a conductor 89, and also connected by a conductor 90 to a variable resistance 91 leading to the opposite end of the filament 81. The coil 74 is bridged by a tuning condenser 92 shunted around the ends thereof.

In order to cause regeneration in the tube 79, the plate circuit of said tube includes a small inductance coil 93, inductively associated with the coil 74. The plate circuit of the tube 79 is transformer-coupled by means of a transformer 94 to the grid circuit of an amplifier rectifier audion tube 95, having the usual grid leak resistance 96 and grid condenser 97. A high voltage battery 98 provides the plate potential for both the tubes 79 and 95, as shown. The filament of the tube 95 is supplied with low voltage from the battery 88, which also supplies the tube 79 by means of conductors 95a, 95b, respectively, the latter conductor including a variable resistance 95c. A relay 99, which is bridged by a by-pass condenser 100 is connected in the plate circuit of the tube 95, and is adapted to be actuated by the passage of the pointer disc 73 into the field of the coil 74 to control any desired auxiliary mechanism in a manner similar to that described in the first two forms of the invention. The amplifier rectifier tube 95 is provided with the usual grid 101, filament 102 and plate 103.

In all forms of the invention, the eddy currents induced by a pointer or a disc carried thereby, when introduced into the field of an inductance coil, react upon said coil in such a manner as to produce a load similar to that caused by a number of short circuited turns of said coil. The movement of the small metal disc causes changes to occur simultaneously in the intensity of the oscillating component of the plate current and the attendant direct current.

In the form of the invention shown in Fig. 3, however, the change of oscillating plate current component of the tube 79 is utilized to actuate the relay by first rectifying the current through the amplifier rectifier tube 95.

It will be further noted, with particular reference to Figures 1 and 3, that applicant discloses a feedback circuit including an electron discharge device having inductively coupled input and output impedances in conjunction with an element, such as the pointer illustrated, which is responsive to a variable condition and comprises metallic means movable therewith. The latter is juxtaposed to one only of the aforementioned impedances for varying said impedance, and therefore the ratio between said impedances to vary the extent of feedback. In Figure 1, moreover, the input and output circuits include sections of a winding 14, which sections are interrelated to establish a potential gradient along the entire length of said winding; and the pointer vane portion is adjacent only one of said winding sections, so as to vary the relative impedance of said sections and thus modify the aforesaid potential gradient to change the feedback.

While there have been disclosed in this specification three forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In combination an oscillator circuit including an electron tube having input and output circuits, a winding having a tap to form sections, one in each of said circuits, said winding sections being interrelated to establish a predetermined potential gradient along said entire winding and thereby maintain an oscillatory condition of said tube through feedback from said output circuit to said input circuit, and an element responsive to a variable condition and comprising means of conductive material movable principally in the field of one only of said winding sections and adapted to vary the relative impedance of said input and output circuits and thus modify said potential gradient to thereby change said feedback.

2. In combination, a feedback circuit including an electron discharge device having inductively coupled input and output impedances, and an element responsive to a variable condition, said element comprising metallic means movable therewith and adapted to be juxtaposed to one only of said impedances for varying said impedance and thereby the ratio between said impedances to vary the extent of feedback in said circuit.

3. In combination, an element responsive to a variable condition and comprising conducting means, a feedback circuit including an electron discharge device having inter-related input and output winding sections forming a single winding having a potential gradient throughout its entire length, said conducting means being adjacent one end of said winding for varying the impedance of the adjacent section with respect to that of the remote winding section to thereby modify said potential gradient and thus to change the extent of feedback in said circuit.

4. In combination, a feedback circuit including an electron discharge device having input and output impedances interrelated to form a continuous winding having a potential gradient throughout its length, and an element responsive to a variable condition, said element comprising metallic means movable therewith in proximity to one end only of said winding for varying the ratio between said impedances and thereby the extent of feedback in said circuit.

LINCOLN THOMPSON.